Oct. 2, 1945.　　　F. W. McLARTY　　　2,386,132
AMPHIBIAN VEHICLE
Filed Sept. 8, 1942　　　4 Sheets-Sheet 1

Inventor
Frank W. McLarty,

By Church & Church
Attorney

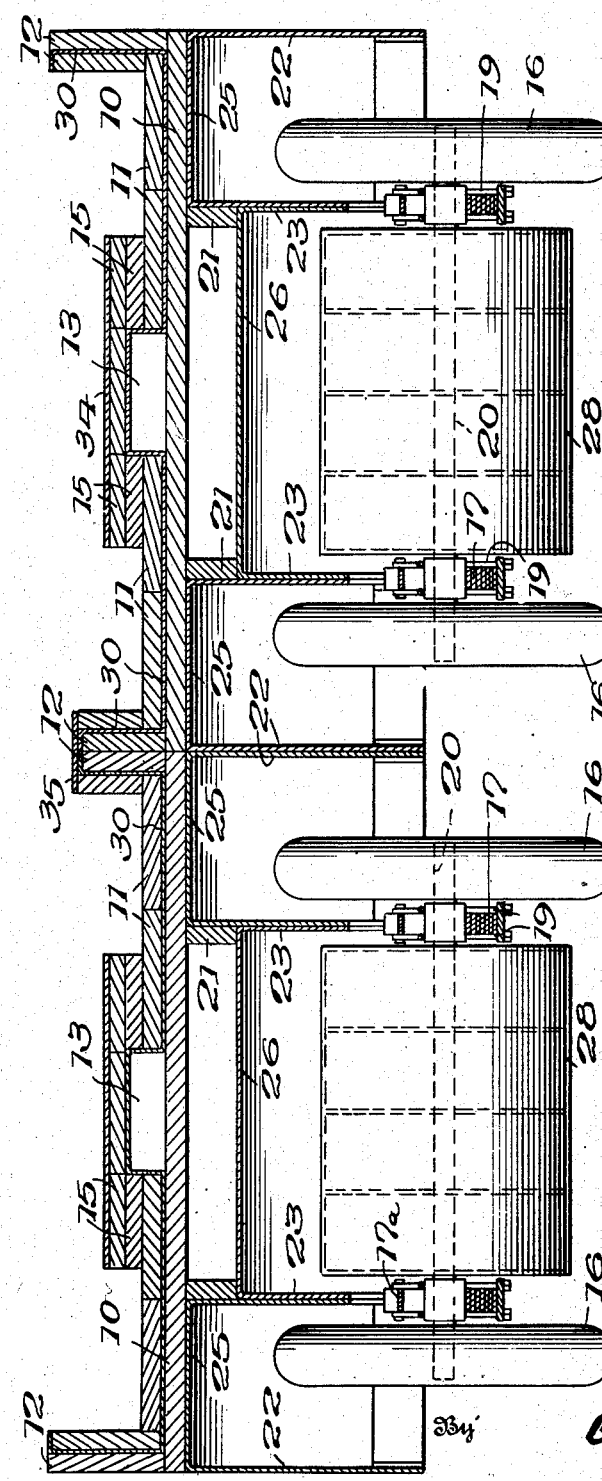

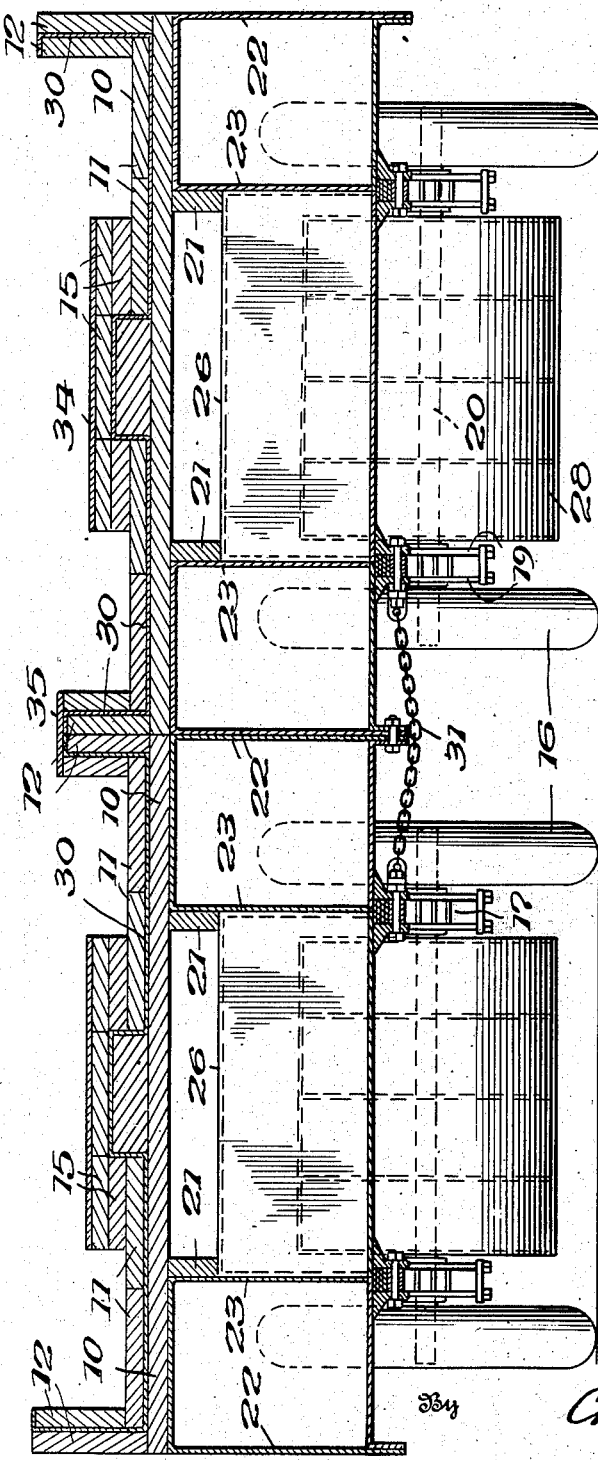

Oct. 2, 1945.   F. W. McLARTY   2,386,132
AMPHIBIAN VEHICLE
Filed Sept. 8, 1942   4 Sheets-Sheet 4
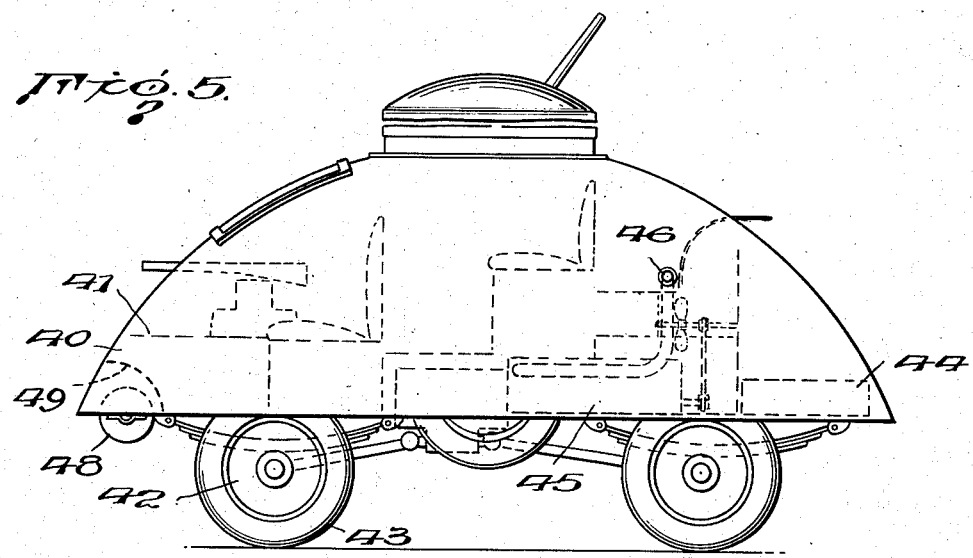
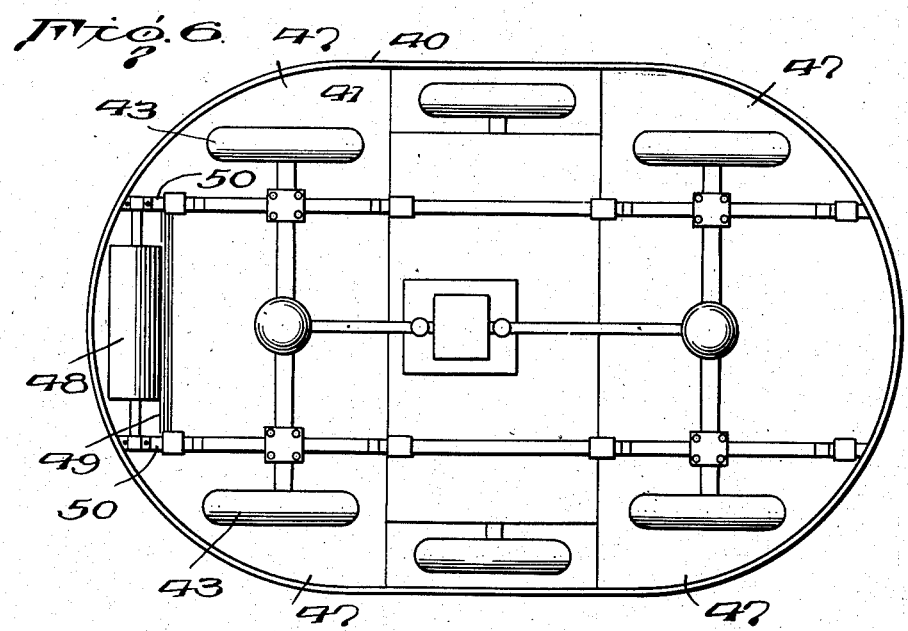
Inventor
Frank W. McLarty,
By Church & Church
Attorney Patented Oct. 2, 1945

2,386,132

UNITED STATES PATENT OFFICE 2,386,132

AMPHIBIAN VEHICLE

Frank W. McLarty, Vernon, Tex.

Application September 8, 1942, Serial No. 457,653

13 Claims. (Cl. 114—0.5)

This invention relates to improvements in vehicles of the military type, and particularly to amphibian vehicles.

The primary object is to provide vehicles, such as units from which a pontoon bridge may be constructed, or such as armored combat vehicles, which are constructed with tanks or reservoirs that are substantially part of the vehicle floor and can be used for storage compartments or, when emptied, for increasing the buoyancy of the vehicle for marine purposes.

Another object of the invention is to provide a vehicle of the character described with a floor which is reinforced by the tanks or compartments that constitute the primary storage spaces or, if empty, the primary means for imparting buoyancy to the vehicle.

A still further object is to so design said primary storage spaces as to not interfere with the ground wheels of the vehicle and so as to permit the provision of auxiliary supply containers on the wheel axes, the arrangement as a whole imparting maximum buoyancy to the vehicle when the several compartments and containers are empty.

Another object is to provide against surging of liquids in the containers on the wheel axle and to facilitate mounting and demounting of said containers by forming a drum of a multiplicity of sections, each of which is divided longitudinally of said axle.

Still another object is to increase the buoyancy of the vehicle by substantially sealing the floor thereof with a layer of impervious material interposed between two or more layers of floor members. Preferably, in the case of the pontoon bridge unit, the floor is provided with upstanding edge portions and the impervious material is also extended over these portions to better prevent water gaining access to the floor surface when the unit is used in the water.

With these and other objects in view, the invention consists in certain details of construction and combinations and arrangements of parts, all as will hereinafter be more fully described and the novel features thereof particularly pointed out in the appended claims.

In the accompanying drawings:

Fig. 2 is a transverse vertical section on the line 2—2 of Fig. 1, but showing two units together, side by side;

Fig. 3 is a similar view on the line 3—3 of Fig. 1;

Fig. 5 is a side elevation illustrating more or less diagrammatically an armored vehicle of the amphibian type; and Fig. 6 illustrates diagrammatically, in plan view, the vehicle of Fig. 5.

Figure 1:
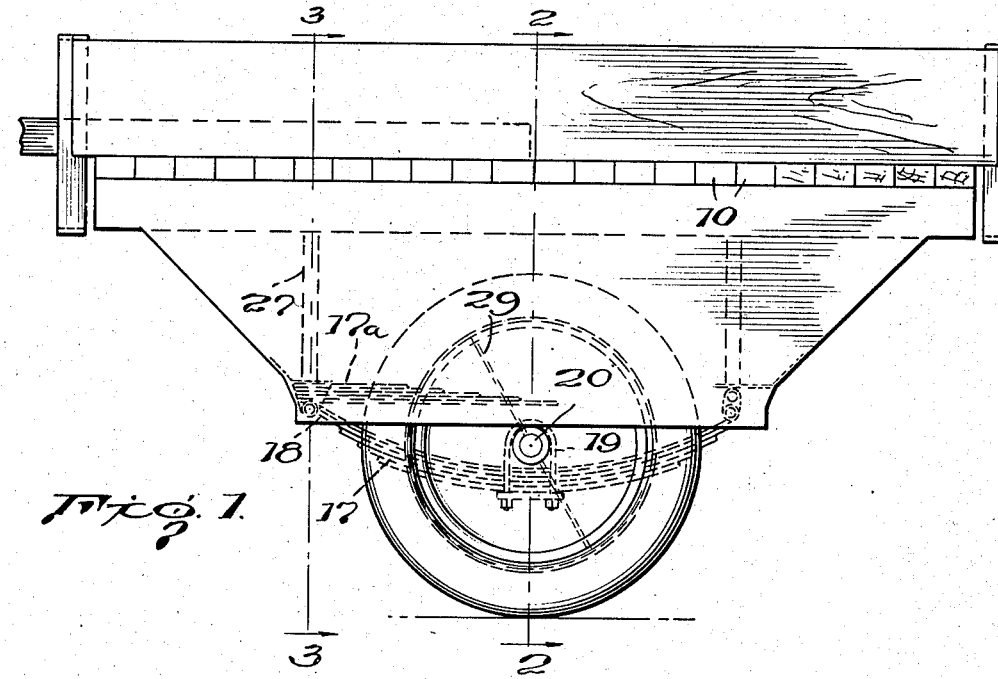
Figure 1 is a side elevation of one of the pontoon bridge units constructed in accordance with the present invention.
Figure 4:
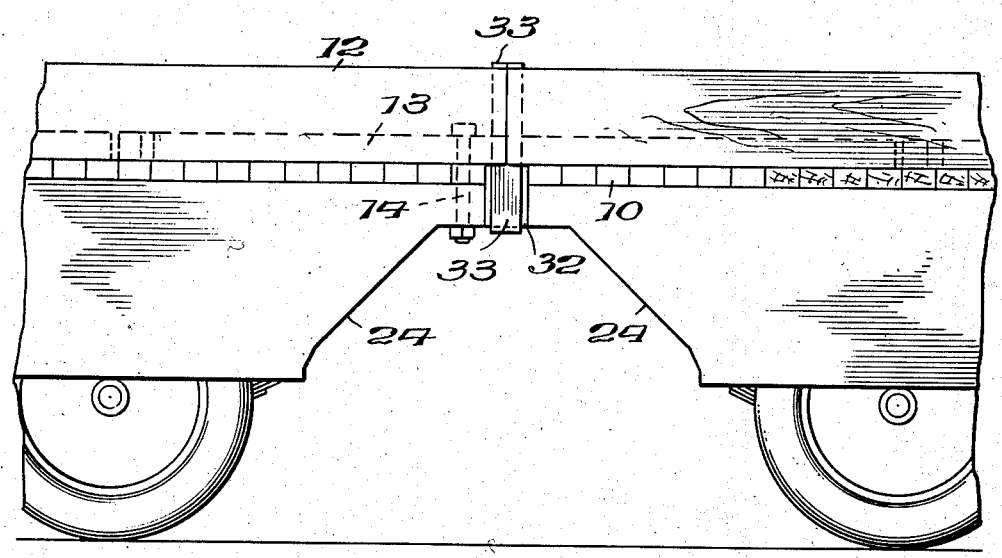
Fig. 4 is a side elevation illustrating portions of two units as connected end to end in forming a pontoon bridge.

In accordance with the present invention, the pontoon bridge unit illustrated in Figs. 1 to 4 has a floor surface composed of a plurality of timbers preferably arranged in two or more layers, as indicated at 10, 11, with the timbers in one layer disposed longitudinally of the body and those of the other layer arranged transversely. Upstanding timbers 12 are disposed along the edges of the floor and located centrally of the floor is a tongue 13 by which the vehicle or bridge unit may be hauled over land and by which the units can be attached to one another, end to end. As shown in Fig. 4, the tongue 13 of one unit may be attached to a second unit by coupling pins 14, with the units spaced somewhat apart for travel on land, but by providing the holes for the coupling pins the units can be coupled close together to form a continuous floor surface or bridge over a body of water. For additional stability, when assembled as a bridge, units may also be arranged side by side, as shown in Figs. 2 and 3. Such an arrangement is especially useful for propelling heavy vehicles, such as tanks or trucks, across a body of water, under which circumstances additional floor timbers 15 can be laid alongside the tongues to form heavy ways on which the tank or truck can run. The floor, or body, is resiliently supported on ground wheels 16, preferably of the pneumatic type, through springs 17 which are attached by shackles 18 to the body and by clips 19 to the wheel axle 20. Overload springs 17a may also be provided.

The bottom floor timbers are preferably supported on longitudinal floor frame timbers 21, but this body, composed of floor and frame timbers, is given considerably greater strength by metal sills arranged lengthwise of the floor and depending therefrom. In the present instance, four metal sills are shown arranged in pairs at each side of the unit floor, the outer sill of each pair being indicated at 22 and the inner sills at 23. However, the primary purpose of these sills 22, 23 is to lend buoyancy to the unit when used for marine purposes. As will be appreciated, by closing the ends and tops of the several spaces defined by the sills, pockets are formed in which air will be trapped when the lower edges of the sills are submerged, and, while auxiliary means hereinafter described are provided for floating the unit, it is preferred that these pockets be made of ample volume to float the unit and any load that may be imposed thereon. The end closure plates for these spaces are shown at 24 and the top closures at 25. To further utilize the space under the floor, it is preferred that these so-called air pockets also be provided with bottom walls 26 and with means (not shown) for filling the compartments thus formed with fluids and for emptying the same. Fuel or other supply materials for use in other vehicles could thus be stored in these compartments but, of course, some or all of the compartments should be emptied, depending upon the buoyancy of the unit as a whole, before the unit is used for marine purposes. A comparison of Figs. 2 and 3 indicates how the walls 26 between each two sills between which the wheels 16 are located must be dished or curved upward to form wheel housings to accommodate vertical movement of the wheels occasioned by irregularities in a road surface. To impart further rigidity to the body of the unit, cross braces 27 may be arranged between the inner sills 23 at points along the latter.

As previously mentioned, auxiliary means for increasing the buoyancy of the unit are preferably provided. For instance, pneumatic wheels are used and a hollow drum or cylinder 28 can be carried on axle 20 between the inner sills 23. Preferably, this drum or cylinder is divided longitudinally into a number of sections which in turn may be divided along the line 29 (Fig. 1) to facilitate attachment of the same to the axle. By dividing the drum into partitioned sections, surging of liquids in the same is prevented. The drums may be free to rotate on the axle or they can be made fast on the axle. The drums may also be so connected that compressed air in one may be used for discharging the contents of the other. Such an arrangement might also be provided for the several compartments formed between the sills 22, 23. Still further means for increasing the buoyancy of the unit may be provided by interposing heavy sailcloth, canvas or other substantially impervious material 30 between two layers of floor timbers 10, 11 with its edge portions extending over the side boards 12. In such instances, as well as in cases where it is desired to tie two rows of units together to form a pontoon bridge of double width, each two units can be secured together, side by side, by connecting members 31 attached to the shackles 18 beneath the bodies, or, if desired, cross timbers 32 extending the full width of two units may be secured between or across the ends of the units. These timbers 32 may be secured in place by straps 33 which are attached to the exposed ends of the timbers and extend up over the outside upstanding timbers 12 to which they are also attached by suitable fastening means. Preferably, there are two timbers 12 along each side edge and these straps 33, as well as the sailcloth 30, extend between the two edge timbers. If desired, the upper ends of the straps can be split and the two sections bent in opposite directions and fastened to each of the timbers.

In laying or placing the various timbers, especially the floor timbers, the usual practice of breaking joints should, of course, be followed, as this further increases the strength and rigidity of the structure as a whole. To facilitate the retention of the floor timbers 11, as well as the timbers 15, in place, steel plates 34 may be placed over the timbers 15 and attached thereto by suitable fastening means, although it is preferred that such fastening means not extend so far as to require rupture of the sailcloth 30. When two units are attached to each other, side by side, steel plates 35 may also be placed on and secured to the upstanding timbers 12. The spacing of sills 22 from the wheels should also be such as to not interfere with removal and replacement of the wheels. It will be appreciated that each bridge unit is essentially a trailer capable of providing relatively speedy transportation for a small group of men of a mechanized unit and their accessories, a feature of importance so far as concerns their effectiveness in present day warfare. At the same time multiple units can be quickly assembled at the edge of a stream and placed across the same for use as a bridge. What is believed the best mode of utilizing the present bridge units is to attach one or more of them in line behind motor driven vehicles, such as trucks or armored cars in which additional men could be transported, and, when a stream is to be crossed, the required number of units could be closely coupled in one or more rows and placed across the stream. Other marine uses might also be made of these units, including securing a number of them together in such an arrangement as to form a substantial wharf structure, or a raft or barge.

In the embodiment of the invention illustrated in Figs. 5 and 6, the vehicle, which is of the armored car type, is adaptable to marine as well as land use by reason of the fact that its side walls, indicated in outline at 40, extend down below the car bottom 41 to form pockets 47 in which the wheels 42 are located. Said side wall and bottom being imperforate at least at these points, the wheel pockets actually become air pockets when the vehicle is submerged to a point above the lower edge of the side wall. These pockets may be made of any desired depth and, by having them located at what might be termed the four corners of the vehicle, air will be trapped in the several subdivisions or pockets, successively, rearwardly of the vehicle, in the event the vehicle is tilted forwardly as it enters a body of water. The wheels are preferably provided with pneumatic tires 43. As indicated more or less diagrammatically, the radiator 44 for the motor 45 may rest on the car floor and the motor may exhaust through an opening 46 in the side wall. Air trapped under the car by the depending side walls and imperforate bottom will float the vehicle in water, the buoyancy of the car being increased by the use of pneumatic tires.

At the forward end of the vehicle, beneath the floor, room may be provided for a cable drum or winch 48. The upper wall of this space for said drum is formed by a plate shown in dotted lines at 49, and at each end of the drum this space is closed by partitions 50 to prevent escape of air from the pockets 47 when said pockets are submerged.

What I claim is:

1. A vehicle of a military type comprising a floor surface, an axle on which said floor is supported, ground wheels on said axle, longitudinally extending sills depending from said floor at opposite sides of said wheels, and imperforate, airtight closures for the tops and ends of the space defined by said sills, all of said sills having their lower edges located in a plane lower than the upper peripheral portions of said wheels.

2. In a pontoon bridge unit, a floor surface, an axle on which said floor is supported, ground wheels on said axle, a pair of longitudinally extending sills depending from said floor adjacent each side of the floor, each ground wheel being located between a pair of said sills with both sills of the pair extending below the upper peripheral portion of the wheel, and imperforate, air-tight closures for the tops and ends of the spaces defined by each pair of sills and of the space defined by the two inner sills.

3. In a pontoon bridge unit, a floor surface, longitudinally extending sills depending from the bottom of said floor arranged in pairs adjacent opposite side edges of the floor, the spaces defined by each pair of sills and by the two inner sills being substantially hermetically sealed at their tops and ends, an axle located below said sills on which said floor is supported, ground wheels on said axle with each wheel located between a pair of said sills, and a hollow drum carried by said axle between the two inner sills.

4. In a pontoon bridge unit, a floor surface, longitudinally extending sills depending from the bottom of said floor arranged in pairs adjacent opposite side edges of the floor, the spaces defined by each pair of sills and by the two inner sills being substantially hermetically sealed at their tops and ends, an axle located below said sills on which said floor is supported, ground wheels on said axle with each wheel located between a pair of said sills, and a hollow drum carried by said axle between the two inner sills, said drum being formed of a series of longitudinally arranged sections with partitions between the sections to prevent surging of liquids stored in the drum.

5. In a pontoon bridge unit, a floor surface, longitudinally extending sills depending from the bottom of said floor arranged in pairs adjacent opposite side edges of the floor, the spaces defined by each pair of sills and by the two inner sills being substantially hermetically sealed at their tops and ends, an axle located below said sills on which said floor is supported, ground wheels on said axle with each wheel located between a pair of said sills, and a hollow drum carried by said axle between the two inner sills, said drum being formed of a series of longitudinally arranged sections with partitions between said sections to prevent surging and each section being divided longitudinally to facilitate attachment to and removal from said axle.

6. A vehicle comprising a floor, metal floor sills depending therefrom, closures at the top, bottom and ends of the space defined by each two contiguous sills forming storage tanks, an axle on which said floor is supported, ground wheels on said axle, each wheel being located between a pair of contiguous sills, and the bottom closures for the spaces between the last-mentioned pairs of sills being dished to accommodate said wheels.

7. A vehicle comprising a floor, metal floor sills depending therefrom, closures at the top, bottom and ends of the space defined by each two contiguous sills forming storage tanks, an axle on which said floor is supported, ground wheels on said axle, each wheel being located between a pair of contiguous sills, the bottom closures for the spaces between the last-mentioned pairs of sills being dished to accommodate said wheels, spring shackles mounted on said tanks, and springs attached to said shackles and to said axle.

8. In a convertible land vehicle and pontoon bridge unit, a floor having upper and lower layers of floor members, a substantially impervious material between the layers of floor members, laterally spaced metal sills depending from the bottom of the floor, means closing the spaces between contiguous sills forming storage tanks, and ground wheels on which said floor and tanks are supported.

9. In a convertible land vehicle and pontoon bridge unit, a floor having upper and lower layers each comprising a plurality of floor members, a substantially impervious material between said layers whereby said floor is rendered substantially air-tight to augment the buoyancy of said unit, side members projecting above the floor, said impervious material also extending substantially to the top of said side members, and ground wheels on which said floor is supported.

10. In a pontoon bridge unit, a floor surface, an axle on which said floor is supported, pneumatic ground wheels on said axle, longitudinally extending sills arranged in pairs at opposite sides of said unit, each wheel being positioned between a pair of said sills, and a drum carried on said axle between the innermost sills.

11. In a pontoon bridge unit, a floor surface, an axle on which said floor is supported, sills depending from said floor arranged in pairs at each side of the unit, pneumatic wheels on said axle in the spaces between each pair of sills, a drum on said axle between the innermost sills, and springs interposed between said axle and floor, said springs being located between said drum and said wheels.

12. In a convertible land and amphibian vehicle of a military type comprising a floor surface and ground wheels on which said vehicle is supported, a plurality of air pockets below said floor, each of said air pockets comprising air-tight side, end and top closure members and being open at its bottom whereby air will be trapped in said pockets when the lower edges of said side and end members are submerged in a body of water said wheels being partially housed in said air pockets.

13. In an amphibian vehicle, a sectional floor having upper and lower layers of floor members, a substantially impervious material between said layers, said material covering substantially the entire area of the layer on which it is superimposed, whereby said sectional floor is rendered substantially air-tight to increase the buoyancy of the vehicle, ground wheels for said vehicle, and a plurality of air pockets beneath said floor to increase the buoyancy of the vehicle said wheels being located in said air pockets.

FRANK W. McLARTY.